USO05487702A

United States Patent [19]
Campbell et al.

[11] Patent Number: 5,487,702
[45] Date of Patent: Jan. 30, 1996

[54] GRAIN WEIGHING AND MEASURING SYSTEM

[75] Inventors: Ronald Campbell, Mendon, Utah; Gaylon Campbell, Pullman, Wash.; Craig Christensen, Logan, Utah

[73] Assignee: HarvestMaster, Inc., Logan, Utah

[21] Appl. No.: 272,238

[22] Filed: Jul. 6, 1994

[51] Int. Cl.⁶ .................................. A01F 12/50
[52] U.S. Cl. ...................... 460/7; 56/10.2 B; 73/73
[58] Field of Search ...................... 460/7, 1, 4, 6; 56/10.2 B, 10.2 C, DIG. 15; 177/50; 73/73; 324/669

[56] References Cited

U.S. PATENT DOCUMENTS

| | | | |
|---|---|---|---|
| 1,203,285 | 10/1916 | Webber . | |
| 1,870,240 | 8/1932 | Domaica . | |
| 2,756,983 | 7/1956 | Furcini . | |
| 3,065,808 | 11/1962 | Dodgen . | |
| 3,073,099 | 1/1963 | Andersen . | |
| 3,606,742 | 9/1971 | Wieneke et al. . | |
| 3,794,911 | 2/1974 | Fathauer | 324/61 QS |
| 3,961,247 | 6/1976 | Toki | 324/65 R |
| 4,337,611 | 3/1982 | Mailander et al. | 56/10.2 |
| 4,360,998 | 2/1982 | Somes | 56/10.2 |
| 4,403,191 | 9/1983 | Satake | 324/452 |
| 4,487,278 | 12/1984 | Rosenthal | 177/25 |
| 4,621,229 | 11/1986 | Hirth | 324/65 R |
| 4,722,408 | 2/1988 | Van De Vliert | 177/126 |
| 4,765,190 | 1/1988 | Strubbe | 73/861.72 |
| 4,766,965 | 8/1988 | Hirota et al. | 177/25 |
| 4,852,028 | 7/1989 | Korpela et al. | 364/567 |
| 4,893,241 | 11/1990 | Girodat et al. | 364/424.07 |
| 4,919,222 | 4/1990 | Kyrtsos et al. | 177/139 |
| 4,929,904 | 5/1990 | Bohman et al. | 56/10.2 |
| 4,951,031 | 8/1990 | Strubbe | 340/684 |
| 5,015,997 | 4/1991 | Strubbe | 340/684 |
| 5,092,819 | 3/1992 | Schroeder et al. | 460/7 |
| 5,106,339 | 3/1992 | Braun et al. | 460/7 |
| 5,173,079 | 12/1992 | Gerrish | 460/7 |
| 5,318,475 | 6/1994 | Schrock et al. | 460/1 |
| 5,327,708 | 7/1994 | Gerrish | 460/7 X |

FOREIGN PATENT DOCUMENTS 2216763  2/1989  United Kingdom .

OTHER PUBLICATIONS

Carter Agronomy Research Equipment, Carter Manufacturing Co. Brochure.
"New From Denmark's Technology Show," *Fin*, Mid–Mar. 1991 (p.22).

*Primary Examiner*—Terry Lee Melius
*Attorney, Agent, or Firm*—Wells, St. John, Roberts, Gregory & Matkin

[57] ABSTRACT

A grain measuring and weighing device including an entrance chamber, a constant volume chamber, and a weigh chamber. A plurality of gates controllably move between open and closed positions to allow a known volume of grain to flow between chambers. The weighing and measuring system includes a means for compensating and eliminating forces external to the grain harvester, such as the various forces due to sloping surfaces and rough terrain over which the grain harvester moves, that would otherwise adversely affect the grain yield data. In one embodiment, an accelerometer is use to measure such external forces. In another embodiment, a reference weight is used to measure the external forces.

27 Claims, 5 Drawing Sheets

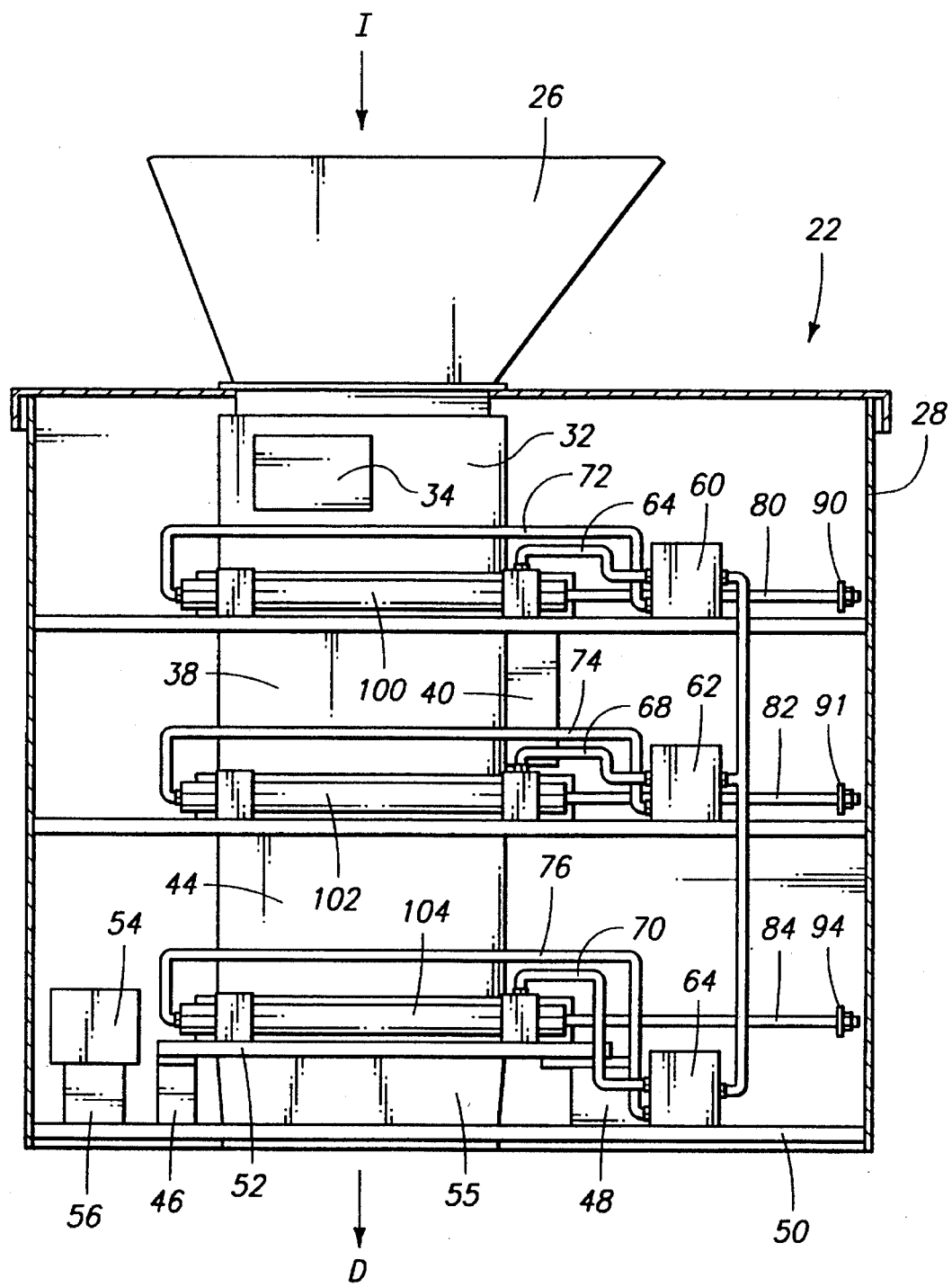

GRAIN WEIGHING AND MEASURING SYSTEM

TECHNICAL FIELD

This invention relates to measuring and weighing devices for grain harvesters.

BACKGROUND OF THE INVENTION

Grain weight, density, and moisture measurements are of importance to farmers and grain harvesters in all regions around the world. These measurements enable determinations to be made and conclusions to be drawn with respect to farming practices and all aspects that affect crop yield. To properly understand and analyze variable that affect grain crop production, it is important to acquire grain weight, density, and moisture measurements which can be mapped to precise locations in the field. Preferably, such precision mapping will plot grain characteristics for a given plot of harvested grain.

Over the years, many efforts have been made to weigh and measure characteristics of crop yields. For example, crop yields have been monitored by harvesting a relatively large area, and then measuring the volume or mass of grain harvested from the area. Such methods are inadequate, however, because they are labor intensive, they lack proper spatial resolution, and the do not provide sufficient data accuracy for assessment of on-farm research results or site-specific agronomic practices.

Other methods of monitoring crop yield have been recently attempted. Measurements related to grain flow in the clean grain system of the combine have been suggested. One system monitors the power required to turn the clean grain auger at the bottom of the combine. Another monitors the pressure of grain coming over the top of the clean grain elevator by placing metal "fingers" on load cells in the grain stream. Yet another system tries to monitor the level of grain in the grain bin. In each of these methods, grain flow is monitored to produce yield information. The basic problem with respect to each of these systems, however, is that they all involve calibrated methods that have limited accuracy. The indicated grain flow varies depending upon the moisture, density, and possibly temperature of the grain. Furthermore, output of the particular sensor may not be linear with grain flow, which could cause further errors.

Some traditional grain harvesters have measured characteristics of grain by feeding a small container and taking measurements of the grain while in the small container. One example is U.S. Pat. No. 5,173,079. This patent discloses a grain measuring and weighing system wherein a suspended bucket is filled so that grain inside the suspended bucket can be measured and weighed. In an alternative embodiment, this patent discloses the concept of weighing the actual grain storage bin to determine the grain characteristics. Such a system is incapable, however, of obtaining adequate and sufficient statistical information on the grain harvest to enable accurate plotting of grain characteristics in a given experimental plot. Heretofore, prior grain measurement systems have failed to provide precise grain measurement data typically due to one of the following: a) grain moisture measurement taken on a single small sub-sample of the entire grain sample being tested; b) static weigh methods being used on a moving platform; c) the absence or poor design of volumetric chambers for density measurements on existing systems; d) user administered system calibration procedures for weight and moisture measuring devices; or e) lack of grain moisture measurement compensation for the density of the sample.

A problem with any continuous measuring system is the effect of various forces exerted on the grain harvester due to sloping surfaces and rough terrain over which the grain harvester moves. For example, the harvester will experience significant amounts of vertical acceleration (i.e., up and down motion from bouncing of the harvester) during harvesting. In addition, vibration of the harvester itself will cause errors and other problems in traditional measuring systems. Still another concern relates to making accurate measurements when the grain harvester is traversing a sloped hillside.

There is a need, therefore, to provide a grain weighing and measuring device capable of continuously measuring precise characteristics of grain being harvested with respect to weight, density, and moisture content on a plot-by-plot basis simultaneously while harvesting the grain. There is also a need to provide a grain measuring and weighing device that will account for and overcome weighing and measuring errors caused by external forces exerted on the harvester as well as the effects of moving a grain harvester across sloped surfaces.

The present invention involves a grain measuring and weighing device that measures grain samples on a continuous basis as the harvester proceeds from grain plot to grain plot. In addition, the grain harvester has a means for compensating and eliminating influences external to the grain harvester that would otherwise have an adverse effect on such measurements, such as vertical acceleration of the harvester and the effect of harvesting grain on sloped surfaces. Other advantages, features, and objects of the invention will become apparent from the detailed disclosure of the invention that follows.

BRIEF DESCRIPTION OF THE DRAWINGS

Preferred embodiments of the invention are described below with reference to the accompanying drawings, which are briefly described below.

FIG. 5 is a side elevation view of an alternative embodiment of the grain weighing and measuring apparatus of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
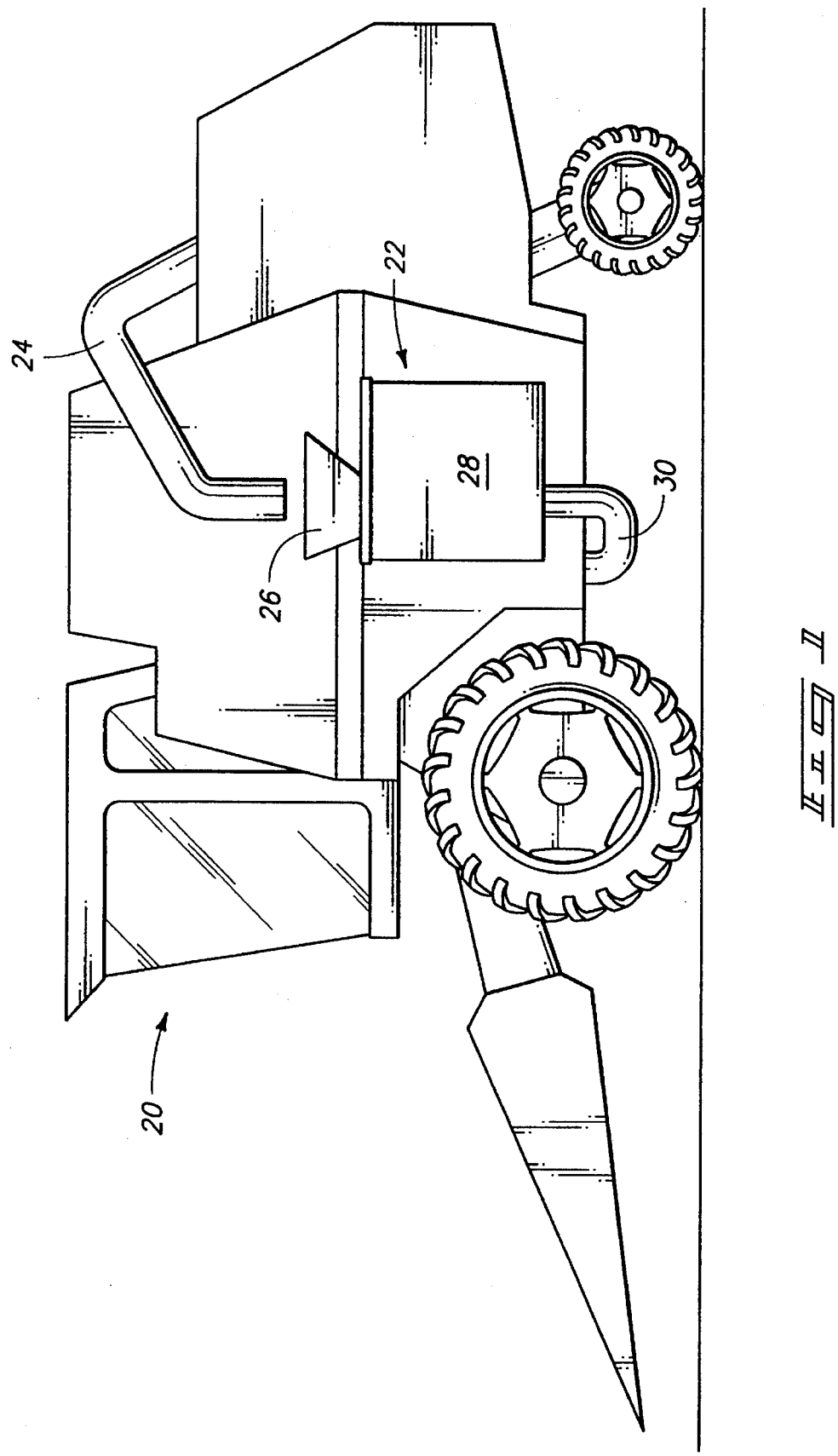
FIG. 1 is a side elevation view of a grain harvester including the grain weighing and measuring system according to the present invention.

FIG. 1 shows one type of a grain harvester 20 on which a grain measuring and weighing apparatus 22 is mounted. In the FIG. 1 embodiment, a feed line 24 provides a continual feed of grain into a hopper 26 of the grain weighing and measuring apparatus 22. The grain weighing and measuring apparatus is contained within an enclosure 28 to which the hopper 26 is attached. After the appropriate measurements have been made and appropriate analysis of the grain has been made, the grain within the enclosure 28 is discharged via discharge shoot 30. The location of the weighing and measuring device as shown in FIG. 1 is but one of many possible locations for the apparatus.

Figure 2:
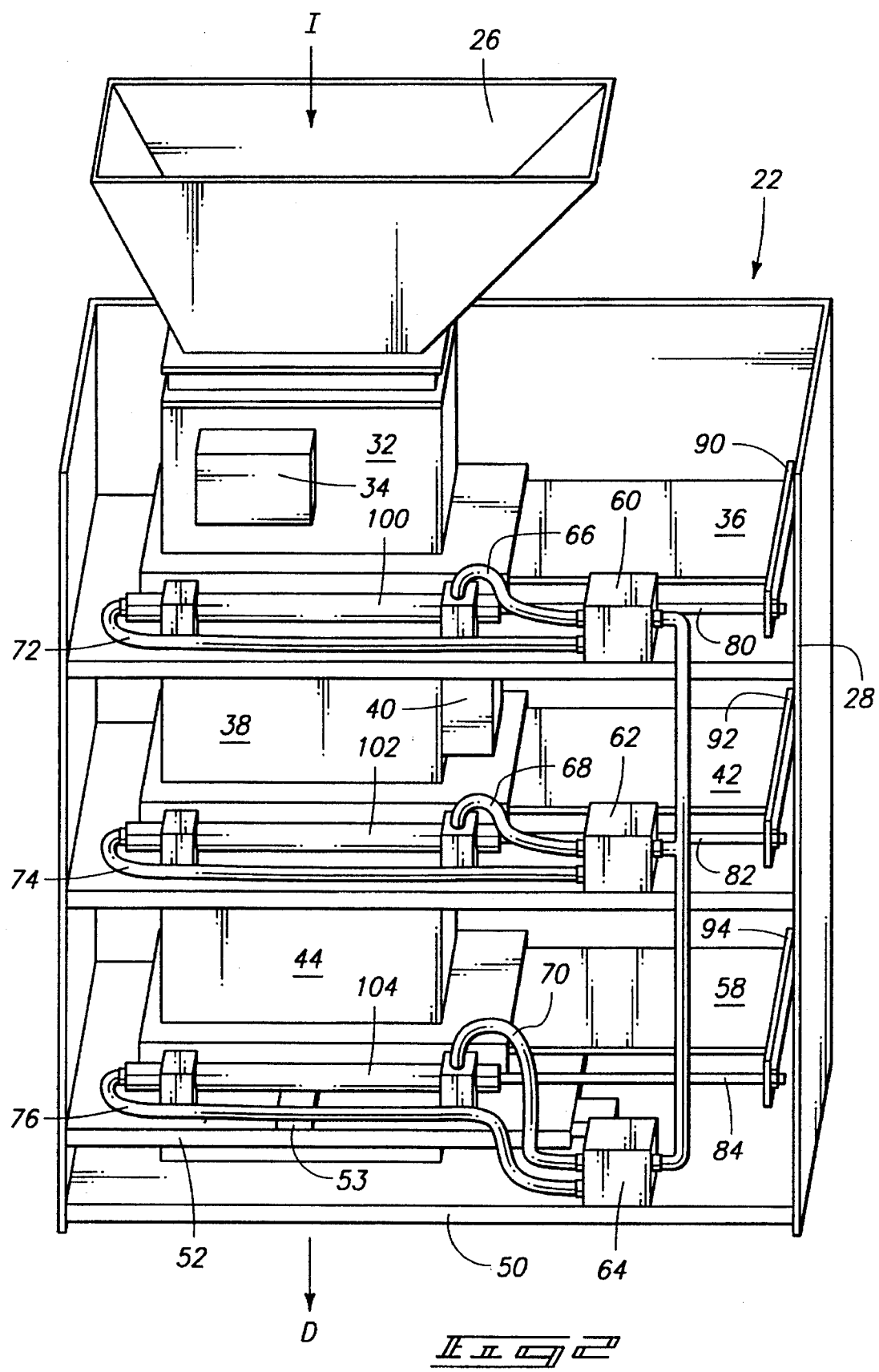
FIG. 2 is a perspective view of the grain weighing and measuring apparatus according to the present invention.

FIG. 2 shows the grain weighing and measuring apparatus 22 in greater detail. The grain weighing and measuring apparatus may be used in connection with a wide variety of grain, from small grains such as canola and grain sorghum, on one end of the spectrum, to corn and soybeans at the other end of the spectrum. The grain weighing and measuring system continuously measures weight, density, and moisture of grain while the grain is being harvested. It accomplishes this measurement in a shorter time period and more accurately than conventional techniques using conventional devices on plot harvest combines.

The grain weighing and measuring apparatus includes a hopper 26 attached to an entrance chamber 32. A level detector 34, coupled to the entrance chamber 32, is used to determine the level of grain in the entrance chamber. The level detector 34 senses the level of the grain using any of several methods, such as optical, dielectrical, or mechanical sensing means. The level detector senses when the grain has completely filled the known constant volume chamber 38, and initiates closing of the first gate 36, thereby precisely sizing a grain sub-sample to be weighed.

A moisture sensor 40 is coupled to the volume sizing chamber 38. The moisture sensor 40 includes a probe (not shown) that protrudes into the sample for measuring the moisture content of the grain.

Figure 3:
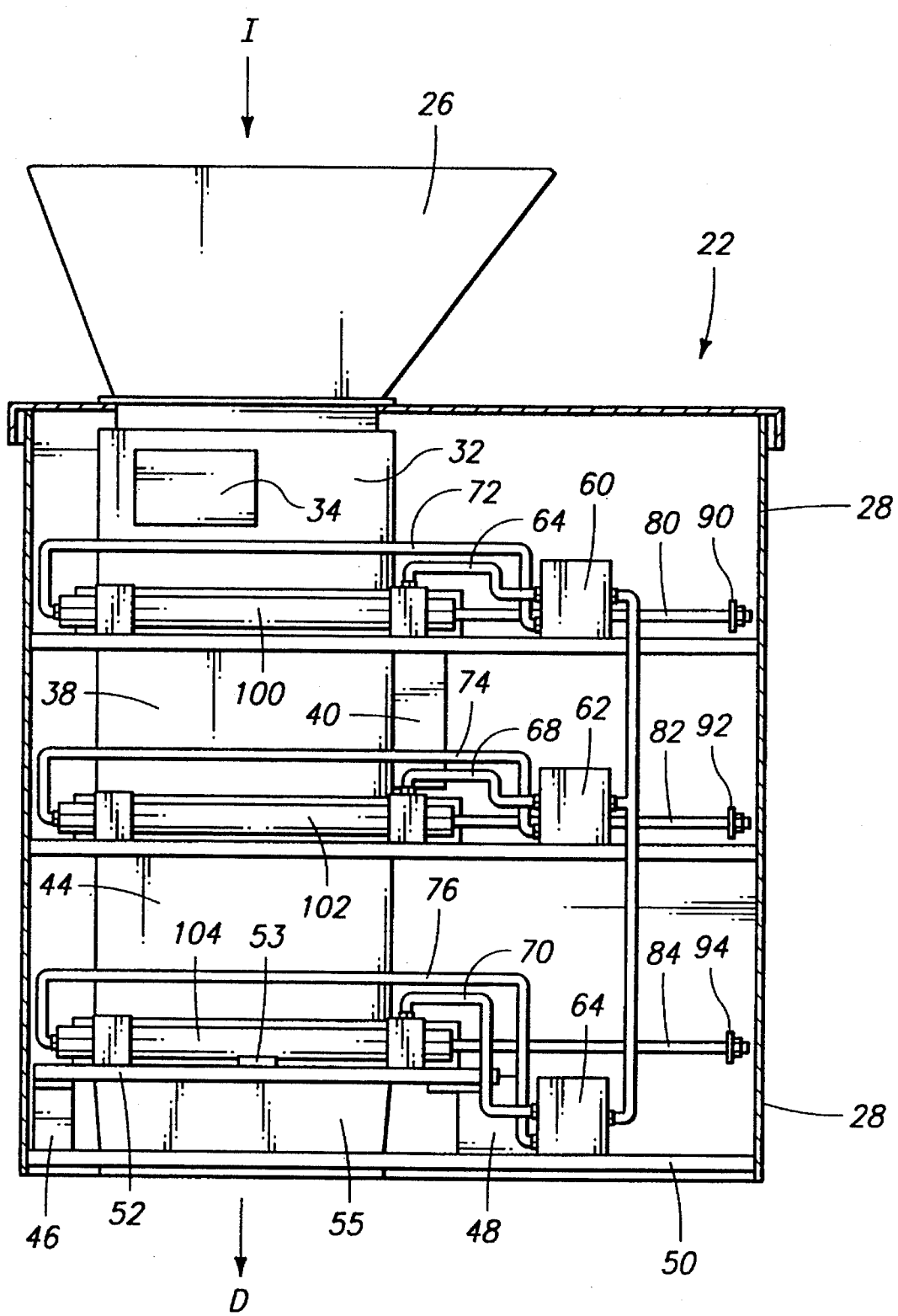
FIG. 3 is a side elevation view of the grain weighing and measuring apparatus of FIG. 2.
Figure 4:
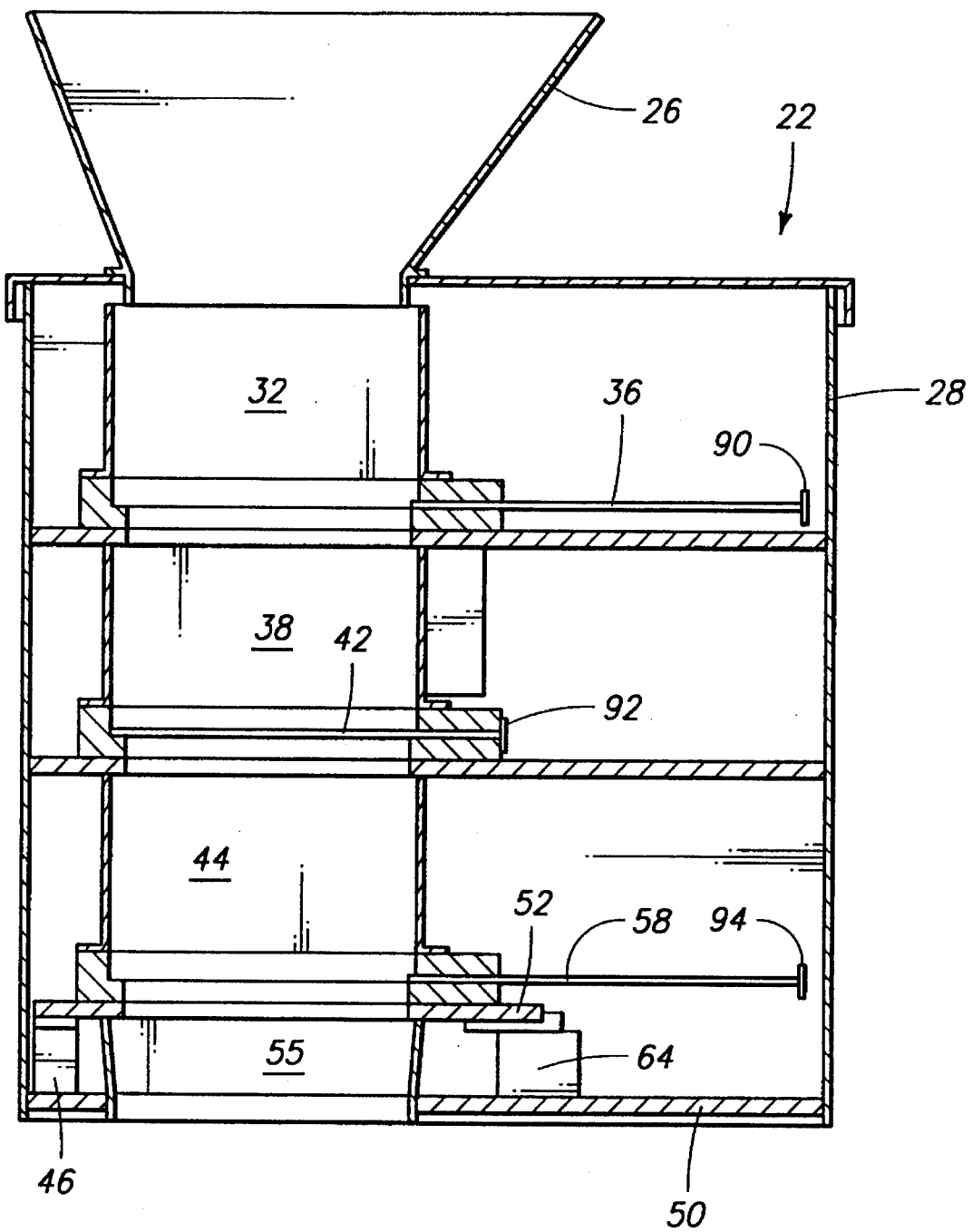
FIG. 4 is a side elevation view, partly in section, of the grain weighing and measuring apparatus of FIG. 2.

After an accurate moisture measurement of the grain is made, a second gate 42 is opened and the grain is allowed to pass into a weigh chamber 44. With reference to FIGS. 3–4, a pair of load cells 46, 48 are positioned so as to suspend a platform 52 on which the weigh chamber is supported. The load cells 46, 48 rest on top of a floor 50 of the enclosure 28. The load cells measure the weight of the grain sub-sample in the weigh chamber 44 by conventional strain gauge measurements.

The embodiment of FIGS. 2-4 shows the use of an accelerometer 53 to measure acceleration of the weighing and measuring apparatus 22 and thereby eliminate errors in grain measurements due to motion of the grain harvester and/or angular inclination. Data from the accelerometer is provided to a control unit which adjusts the grain measurements to compensate for such acceleration and/or inclination of the harvester. The accelerometer 53 is mounted in a coplanar relationship to the first and second load cells 46, 48.

An alternative embodiment of the weighing and measuring apparatus is shown in FIG. 5. A known or reference weight 54 is used to compensate for errors in grain measurements due to acceleration of the harvester and/or angular inclination. The reference weight 54 is suspended by a third or reference weight load cell 56. The load cell 56 measures the known or reference weight, which will experience the same acceleration and/or angular inclination changes experienced by the grain sub-sample. Data from measuring sub-samples of grain are contemporaneously and synchronously acquired with readings from a reference weight which defines the platform's motion in the axis normal to the weighing plane. Thus, the effects of such acceleration and/or angular inclination on grain measurements can be calculated, resulting in precision data for the grain characteristics.

After the grain has been properly weighed, a third gate 58 is opened and the grain is allowed to discharge via route D through a discharge chute 55 and into the discharge tube 30 (FIG. 1). The grain is thereafter fed to the main grain tank of the harvester.

The slide gates 36, 42, 58 comprise essentially flat shelves with end plates 90, 92, 94 formed on one end. The gates reciprocate between open and closed positions by sliding along opposed guides underneath the entrance chamber, volume sizing chamber, and weigh chamber, respectively.

Operation of the sliding gates 36, 42, 58 is carried out by plurality of pneumatic valves 60, 62, 64 which direct pressurized fluid to one of the ends of respective piston-cylinder actuators 100, 102, 104. The valves are actuated by a control unit electronically coupled to the respective valves 60, 62, 64.

Respective rods 80, 82, 84 are coupled to the pistons (not shown) within the piston-cylinder actuators 100, 102, 104. The rods 80, 82, 84 are coupled, in turn, to respective end plates 90, 92, 94 of the sliding gates 36, 42, 58. When the gates are to be closed, pressurized fluid will selectively pass through one or more of the pneumatic lines 66, 68, 70. Alternatively, when the respective gates are to be opened, pressurized fluid will be directed toward one or more of the pneumatic lines 72, 74, 76.

FIG. 4 shows a sectional view of the weighing and measuring device 22 with the first slide gate 36 in an open position. The second slide gate 42 is shown in a closed position, and the third slide gate 58 in an open position.

In operation, grain is introduced through the hopper 26 via inlet path (I) and directed to the entrance chamber 32. Grain is fed to the hopper continuously while the harvester is in operation. While a subsample enters entrance chamber 32, the first gate remains open, and the second gate 42 is closed, allowing constant volume chamber 38 to fill. When the grain level sensor 34 senses that the static grain level has reached the top of the constant volume chamber 38, the first gate closes, trapping a precision volume of grain in the constant volume chamber. Flowing grain into the system from feed line 24 accumulates in hopper 26 and in entrance chamber 32 while the moisture sensor 40 makes its measurement.

After the moisture measurement has been made, the second gate 42 opens and allows the grain sub-sample to fall by gravity into the weigh chamber 44. After the grain sub-sample has been transferred to the weigh chamber, the second gate 42 closes in preparation for a subsequent grain sub-sample. As the weighing process of the weigh chamber 44 begins, refilling of the constant volume chamber 38 takes place through the opening of the first gate 36.

The weight of the grain sub-sample in the weigh chamber 44 is determined by means of a pair of load cells 46, 48 from which weigh chamber 44 is suspended. The processing of a sub-sample of grain can be accomplished in a matter of seconds. The grain may therefore be continuously measured as the harvester works a particular plot.

To compensate for changes in vertical acceleration due to bumps experienced by the harvester, and to the angular inclination of the harvester, an accelerometer may be used to provide relevant reference acceleration data to the control unit. Alternatively, a third load cell with a reference weight suspended therefrom may be used to provide relevant data to the control unit to compensate for such variations due to acceleration and inclination.

After the grain harvester has completed harvesting a plot, the data generated from the grain sub-samples are totalized by the electronics and software in a control unit to yield a total plot weight. Sub-sample densities and moisture readings are averaged to give a plot average reading of these parameters as well. In achieving continuous yield recording, weight, density, and moisture are recorded along with precision position of the harvester in the field (determined by a conventional GPS or other appropriate device), to generate a continuous yield map.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A weighing and measuring apparatus for continuously measuring sub-samples of a grain plot during harvesting, comprising:

an enclosure;

an inlet controllably directing a continuous flow of grain into the enclosure;

volume sizing means mounted within the enclosure for separating a known volume sub-sample of grain from the continuous flow of grain into the enclosure;

moisture measuring means mounted within the enclosure for detecting the moisture content of the grain sub-sample;

weigh means mounted within the enclosure for weighing the grain sub-sample;

a reference measurement means positioned adjacent the weigh means inside the enclosure for determining external forces acting on the grain sub-sample during weighing and measuring; and an outlet for directing the grain sub-sample from the enclosure and into a grain storage tank of a grain harvester.

2. A weighing and measuring apparatus according to claim 1 wherein the weigh means comprises a weigh chamber and a weigh chamber load cell operatively coupled to the weigh chamber.

3. A weighing and measuring apparatus according to claim 1 wherein the reference measurement means comprises a reference weight and a reference weight load cell operatively coupled to the reference weight.

4. A weighing and measuring apparatus according to claim 1 wherein the weigh means comprises a weigh chamber and a weigh chamber load cell operatively coupled to the weigh chamber, and wherein the reference measurement means comprises a reference weight and a reference weight load cell operatively coupled to the reference weight.

5. A weighing and measuring apparatus according to claim 4 wherein the reference weight load cell and the weigh chamber load cell are positioned in a coplanar relationship relative to one another.

6. A weighing and measuring apparatus according to claim 1 wherein the reference measurement means comprises an accelerometer.

7. A weighing and measuring apparatus according to claim i wherein the reference measurement means comprises an accelerometer, the accelerometer being mounted in a coplanar relationship relative to the weigh means.

8. A weighing and measuring apparatus according to claim 1 wherein the volume sizing means includes a level detector to sense a grain level corresponding to the known volume sub-sample of grain.

9. A weighing and measuring apparatus for continuously measuring sub-samples of a grain plot during harvesting, comprising:

a weigh chamber for mounting on a grain harvester, the weigh chamber holding a known volume sub-sample of grain;

a first weigh chamber load cell operatively coupled to the weigh chamber for weighing the sub-sample of grain;

a reference weight;

a reference weight load cell operatively coupled to the reference weight; and means for detecting the effects of external forces other than gravity acting on the reference weight and for cancelling these effects in determining the weight of the known volume grain sub-sample.

10. A weighing and measuring apparatus according to claim 9 wherein the first weigh chamber load cell and the reference weight load cell are mounted in a coplanar relationship relative to one another.

11. A weighing and measuring apparatus according to claim 9, further comprising a second weigh chamber load cell, the first weigh chamber load cell, the second weigh chamber load cell, and the reference weight load cell being mounted in a coplanar relationship relative to each other.

12. A weighing and measuring apparatus for continuously measuring sub-samples of a grain plot during harvesting, comprising:

a weigh chamber for mounting on a grain harvester, the weigh chamber holding a known volume sub-sample of grain;

a first weigh chamber load cell operatively coupled to the weigh chamber for weighing the sub-sample of grain;

an accelerometer mounted adjacent the weigh chamber to detect external forces acting on the grain sub-sample.

13. A weighing and measuring apparatus according to claim 12 wherein the first weigh chamber load cell and the accelerometer are mounted in a coplanar relationship relative to one another.

14. A weighing and measuring apparatus according to claim 12, further comprising a second weigh chamber load cell, the first weigh chamber load cell, the second weigh chamber load cell, and the accelerometer being mounted in a coplanar relationship relative to each other.

15. A weighing and measuring apparatus for continuously measuring sub-samples of a grain plot during harvesting, comprising:

an entrance chamber positioned on a grain harvester to receive a continuous flow of grain during operation of the grain harvester;

a level detector located inside the entrance chamber for sensing the level of grain that corresponds to a known volume sub-sample of grain;

a volume sizing chamber coupled to the entrance chamber, the volume sizing chamber being sized to receive the grain sub-sample;

a first gate coupled between the entrance chamber and the volume sizing chamber, the first gate being moveable between an open position and a closed position to allow the grain sub-sample to flow from the entrance chamber to the volume sizing chamber;

a moisture sensor coupled to the volume sizing chamber to detect the amount of moisture in the grain sub-sample;

a weigh chamber coupled to the volume sizing chamber;

a second gate coupled between the volume sizing chamber and the weigh chamber, the second gate being movable between an open position and a closed position to allow the grain sub-sample to flow from the volume sizing chamber to the weigh chamber;

weigh means for weighing the grain sub-sample in the weigh chamber.

16. A weighing and measuring apparatus according to claim 15 wherein the first gate and second gate operate in a manner to allow multiple grain samples to flow controllably and sequentially from the entrance chamber to the volume sizing chamber and from the volume sizing chamber to the weigh chamber.

17. A weighing and measuring apparatus according to claim 15 wherein the first gate and the second gate each move in one plane, reciprocating between open and closed positions.

18. A weighing and measuring apparatus according to claim 15 wherein sub-samples of grain flow by gravity between the chambers.

19. A weighing and measuring apparatus according to claim 15, further comprising a third gate coupled to the weigh chamber opposite the second gate, the third gate moving between open and closed positions to allow the grain sub-sample to flow from the weigh means to a main storage tank on a grain harvester.

20. A weighing and measuring apparatus according to claim 15 wherein the weigh means comprises:

a first weigh chamber load cell operatively coupled to the weigh chamber to determine the weight of the grain sub-sample; and a reference weight mounted adjacent to the weigh chamber, the reference weight being supported by a reference weight load cell to measure external forces exerted on the reference weight.

21. A weighing and measuring apparatus according to claim 15 wherein the level detector is an optical level detector.

22. A method of weighing sub-samples of grain simultaneously while harvesting grain from a field, comprising the steps of:

directing a continuous flow of grain into a grain collection chamber mounted on a grain harvester;

accumulating a known volume sub-sample of grain in the grain collection chamber;

weighing the grain sub-sample while the grain harvester is moving;

measuring the acceleration of the grain sub-sample that is not due to gravity to calculate variations in weight measurements of the grain sub-sample due to acceleration that is not due to gravity; and determining the actual weight of the grain sub-sample, cancelling the effects of the acceleration of the grain sub-sample not due to gravity, while the grain harvester is moving.

23. The method of claim 22, further comprising the steps of:

introducing the grain sub-sample into a constant volume chamber; and measuring the moisture content of the grain sub-sample in the constant volume chamber.

24. The method of claim 22 wherein the step of measuring a constant volume of grain in the grain collection chamber includes sensing the level of grain with an optical level sensor.

25. A method of weighing sub-samples of grain simultaneously while harvesting grain from a field, comprising the steps of:

directing a continuous flow of grain into a grain collection chamber mounted on a grain harvester;

accumulating a known volume sub-sample of grain in the grain collection chamber;

weighing the grain sub-sample; and measuring the acceleration of the grain sub-sample to calculate variations is weight measurements of the grain sub-sample due to acceleration, wherein the step of measuring the acceleration of the grain sub-sample includes weighing a reference weight simultaneously as the grain sub-sample is being weighed.

26. The method of claim 25 wherein the step of measuring the acceleration of the grain sub-sample includes the reference weight and the grain sub-sample being suspended by respective load cells that are coplanar to each other.

27. The method of claim 22 wherein the step of measuring the acceleration of the grain sub-sample includes using an accelerometer to measure acceleration of grain sub-sample.

\* \* \* \* \*